United States Patent
Greenlaw et al.

(10) Patent No.: US 6,328,525 B1
(45) Date of Patent: *Dec. 11, 2001

(54) DELIVERY VEHICLE WITH MULTI-TIER STORAGE OF CARGO

(75) Inventors: Robert J. Greenlaw, Houston; Todd M. Greenlaw, Cypress, both of TX (US)

(73) Assignee: White Foods Foundation, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/250,532

(22) Filed: Feb. 16, 1999

Related U.S. Application Data

(60) Division of application No. 08/587,224, filed on Jan. 16, 1996, which is a continuation-in-part of application No. 08/475,950, filed on Jun. 7, 1995.

(51) Int. Cl.⁷ ....................................................... B60P 1/02
(52) U.S. Cl. ..................... 414/812; 414/679; 414/495; 187/244; 187/249
(58) Field of Search .................................. 414/800, 809, 414/812, 495, 679, 539; 187/244, 249

(56) References Cited

U.S. PATENT DOCUMENTS

| | | |
|---|---|---|
| 1,297,619 | 3/1919 | Wessmann . |
| 1,581,689 * | 4/1926 | Perin ..................................... 414/800 |
| 1,931,237 | 10/1933 | O'Connell . |
| 2,611,640 | 9/1952 | Francis . |
| 2,832,636 | 4/1958 | Black . |
| 3,051,335 | 8/1962 | Bartlett . |
| 3,119,350 | 1/1964 | Bellingher . |
| 3,368,704 | 2/1968 | Pope . |
| 3,786,947 | 1/1974 | Craft, III . |
| 4,015,686 | 4/1977 | Bushnell, Jr. . |
| 4,139,109 | 2/1979 | Murphy . |
| 4,627,784 | 12/1986 | Collins . |
| 4,642,018 | 2/1987 | Leroux et al. . |
| 4,668,142 | 5/1987 | Fity et al. . |
| 4,701,086 | 10/1987 | Thorndyke . |
| 5,036,951 | 8/1991 | Frangos . |
| 5,092,721 | 3/1992 | Prince . |
| 5,096,216 | 3/1992 | McCalla . |
| 5,165,842 * | 11/1992 | Hammer ............................... 414/800 |
| 5,207,333 | 5/1993 | Peng . |
| 5,443,350 | 8/1995 | Wilson . |
| 5,466,030 | 11/1995 | Harris et al. . |
| 5,505,581 | 4/1996 | Gearin et al. . |
| 5,685,228 | 11/1997 | Ehrlich et al. . |
| 5,915,913 * | 6/1999 | Greenlaw et al. .................... 414/679 |
| 5,931,262 * | 6/1999 | Greenlaw et al. .................... 187/244 |

FOREIGN PATENT DOCUMENTS

| | | | |
|---|---|---|---|
| 196-924 | 10/1986 | (EP) | ................................... 410/29.1 |
| 1353904 | 1/1964 | (FR) | ..................................... 414/529 |
| 61-155037 | 7/1986 | (JP) | ..................................... 414/495 |
| 1119-958 | 10/1984 | (SU) | ..................................... 187/249 |
| 88/00538 | 1/1988 | (WO) | ..................................... 414/495 |
| 94/02337 | 2/1994 | (WO) | ..................................... 414/495 |

\* cited by examiner

*Primary Examiner*—Donald P. Walsh
*Assistant Examiner*—Thuy V. Tran

(57) ABSTRACT

A cargo delivery vehicle is described having storage for multiple tiers, or levels, of cargo. The delivery vehicle includes two or more interior elevating platforms, at least one on either side of a center structural wall running parallel to the side walls. Substantially continuous side access doors provide total exterior access to the lowermost tier of cargo. Cargo stored at the upper tier may be positioned by an elevating means at the level of the lower tier for either rear loading or side retrieval purposes. The center structural wall supports a transverse roof truss system that carries suspended outboard loads inward to the center wall. This non-traditional framing system greatly reduces the structural requirements of the sidewalls and floor, thereby permitting largely open framing for multiple side access ports as well as a minimized floor thickness to permit easier access from the pavement.

11 Claims, 6 Drawing Sheets

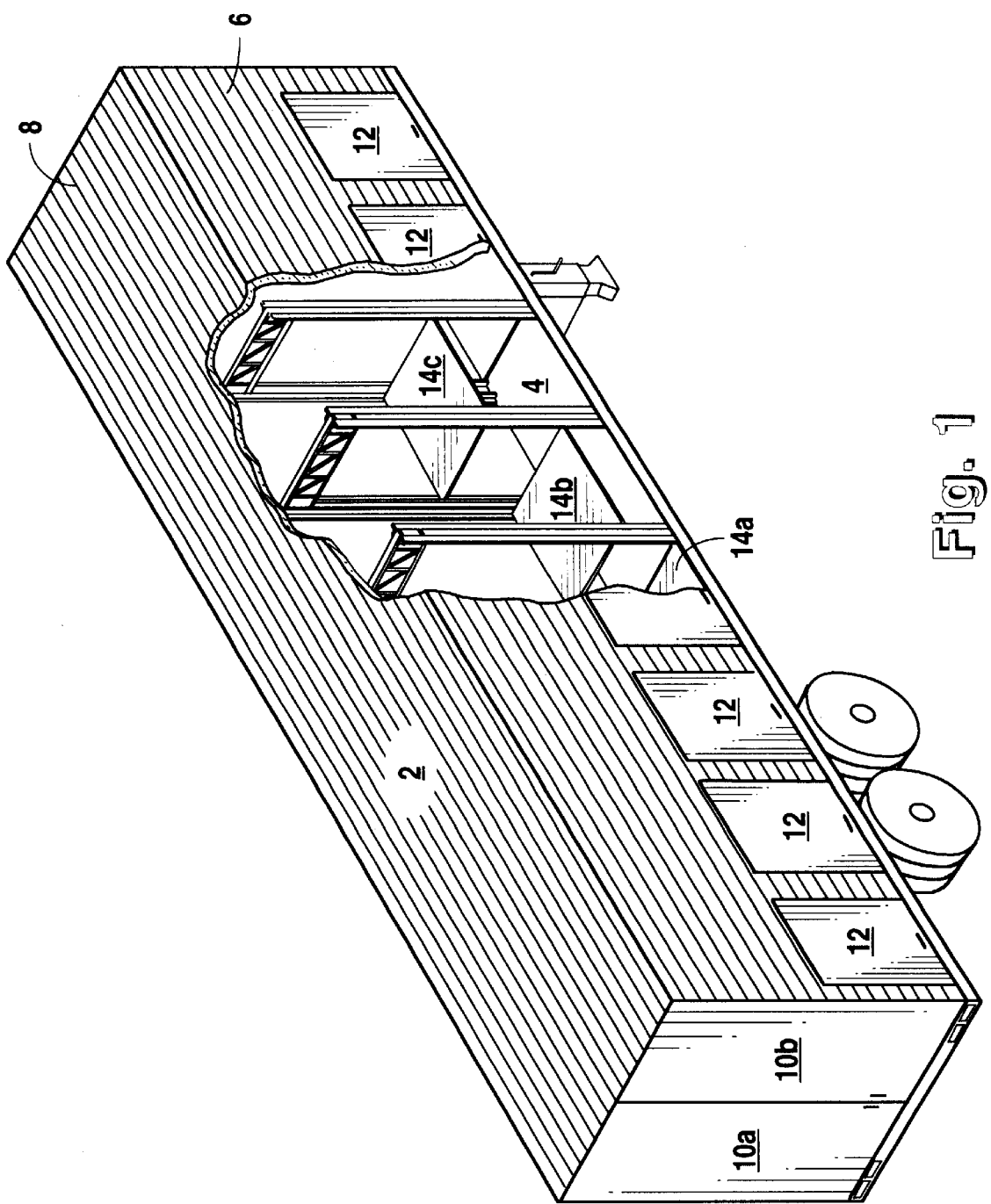

DELIVERY VEHICLE WITH MULTI-TIER STORAGE OF CARGO

This application is a divisional application of copending application Ser. No. 08/587,224, filed on Jan. 16, 1996 which is a C.I.P. of Ser. No. 08/475,950 filed Jun. 7, 1995.

BACKGROUND OF THE INVENTION

The invention relates to cargo delivery vehicles. More particularly, the invention relates to cargo delivery vehicles having multiple tiers of cargo storage which can be easily accessed for loading purposes through the rear doors, and can be unloaded through side access doors without requiring total bodily entry into the delivery vehicle in order to retrieve any portion of the cargo.

It is desirable to store and transport a wide variety of cargo in vehicles having multiple storage tiers so that the most efficient use of the interior space in the vehicle can be made. In many distribution industries, single-tier delivery vehicles suffer from several disadvantages resulting in the inability to utilize the full vertical capacity of the cargo area. One such disadvantage is that stacking cargo to excessive heights introduces potential payload instability. A second disadvantage is that excessive stacking often results in cumbersome access for manual unloading. A third disadvantage of excessive cargo stacking is that upper cargo may crush lower cargo. The structure of an upper tier cargo platform acts as a shelf by keeping the weight of the upper cargo from damaging crushable lower cargo, thus allowing a delivery vehicle to minimize its wheelbase and turning radius by carrying an increased payload capacity in weight per unit of area.

It is also desirable in many distribution applications to utilize a delivery vehicle engineered to provide the structural versatility to both (1) accept palletized cargo through rear doors, as from a warehouse dock, and (2) permit total and random side access to cargo at multiple delivery stops without the inefficiencies or hazards associated with unloading personnel being required to enter the vehicle in order to effect total cargo retrieval.

Typically, the features of rear loading and random-access side unloading are mutually exclusive in the known art of enclosed delivery vehicle construction. Some delivery vehicles in the food service industry provide rear loading with only limited side access, thus requiring total bodily entry into the vehicle in order to fully unload. This arrangement may achieve advantageous loading capabilities, yet suffer from unloading inefficiencies. Conversely, delivery vehicles common to the beverage distribution industry often permit total exterior access to the cargo areas through multiple side doors for unloading, but structurally and logistically prohibit rear loading.

It is still further desirable to provide an elevating means for raising and lowering segmented upper tier cargo platforms such that both an upper and lower level may be loaded or unloaded from the lower level. Total exterior access to all cargo may be preferably achieved via side doors permitting access to multiple sections of the lower level. The elevating means may then provide the capability to lower upper tier cargo to the side-accessible lower level for retrieval.

Multi-tier storage of cargo is well known in the art. For example, it is known to provide upper and lower fixed storage platforms in a multi-tier cargo storage vehicle, as described in U.S. Pat. No. 4,139,109 issued Feb. 13, 1989 to Murphy. A single rear elevator apparatus used to vertically transfer cargo between fixed tiers, as disclosed in the patent to Murphy, possesses the disadvantage that a fixed upper tier cargo platform may prohibit loading personnel from entering the rear of the vehicle to facilitate the forward conveyance of cargo through the interior of the vehicle. Likewise, cargo vehicles with fixed tiers can not provide random access to all tiers of cargo through side access doors positioned at the lowermost tier.

A variety of specialized interior elevator arrangements have been developed to overcome the disadvantages of exterior lift mechanisms and fixed tiers for multi-tier storage. For example, U.S. Pat. No. 2,832,636 issued Apr. 29, 1958 to Black, discloses the use of a single interior elevator platform extending the length of the cargo storage space, which enables the transportation of cargo in two tiers. Segmented platforms formed by multiple adjoining elevators have also been proposed, such as in U.S. Pat. No. 4,701,086 issued Oct. 20, 1987 to Thorndyke. These segmented platforms provide two-tier storage in certain segments and single-tier storage in other segments where tall cargo is to be stored. A similar segmented platform lift apparatus in a multi-tier double drop trailer has been disclosed in U.S. Pat. No. 5,092,721 issued Mar. 3, 1992 to Prince.

But these vehicles with interior elevators are structurally limited to receiving and delivering cargo through rear doors only. As in the arrangement shown by Murphy, the forward cargo is inaccessible while the aft cargo is in place. Such an arrangement may provide a spatially efficient means of transporting cargo between destinations; however, they may be ill suited for adaptation to delivery applications in which cargo retrieval efficiency is a primary concern. Modern distribution systems frequently require the transportation of cargo from a warehouse to multiple delivery stops where unloading efficiency can be greatly enhanced by direct and random access to the entire lower tier through a series of side doors and where an elevating means can also position upper tier cargo platforms at the lower tier level.

A further disadvantage of the vehicles disclosed by Black, Thorndyke, and Prince is that they have elevating cargo platforms that extend transversely the full width of the vehicle' interior. Although full-width elevating platforms can thereby accept cargo up to eight feet wide, it may be more desirable for cargo portions to be longitudinally divided and independently accessible such that cargo placed within a lower tier cargo portion must reside within the average workman's arm's reach, so that his body may remain substantially outside of the delivery vehicle. Accordingly, half-width elevating platforms may reduce the workman's susceptibility to fatigue and injury, since he need not bodily enter the vehicle to load or unload cargo.

In conventional enclosed delivery vehicles having single-tier or multi-tier storage, the floor is typically required to bear the weight of the cargo and transfer those forces longitudinally through either floor or side wall members to the vehicle's axles. The requirement for numerous, closely spaced structural members in the sidewalls may limit the availability of sizable doors for cargo access from the side of the vehicle. Some conventional vehicles offer limited side access through doors penetrating the sidewalls, but such doors are necessarily limited because of the structural compromises they create. Therefore, it is desirable to minimize the load-bearing requirements of the sidewalls of the delivery vehicle in order to afford virtually continuous side access to the cargo.

Moreover, in the construction of enclosed delivery vehicles, the load-bearing floor is typically required to be quite thick for adequate structural support, thereby decreasing the interior space for storage. Therefore, it is also desirable to minimize the load-bearing requirements of the floor of the delivery vehicle in order to maximize interior storage space, especially space located in the ergonomically advantageous lower zone of the trailer.

Accordingly, it is an object of the present invention to provide multi-tier cargo storage in a delivery vehicle.

It is a further object of the invention to provide an enclosed, multi-tier delivery vehicle, which can be loaded completely through rear doors of the vehicle and unloaded completely through side doors of the vehicle.

A still further object of the invention is to provide an enclosed, multi-tier delivery vehicle, which permits direct and simultaneous exterior access to cargo located at the lowermost tier.

A still further object of the invention is to provide an enclosed, multi-tier delivery vehicle with multiple side access ports through which the entirety of the cargo can be manually unloaded without requiring unloading personnel to bodily enter the vehicle.

A still further object of the invention is to provide an enclosed, multi-tier delivery vehicle in which all tiers can be loaded and unloaded at the lowermost tier.

A still further object of the invention is to provide an enclosed, multi-tier delivery vehicle in which the cargo storage area is longitudinally bisected in order that cargo portions may remain within arm's reach of a side wall access door.

A still further object of the invention is to provide an enclosed, multi-tier delivery vehicle in which the load-bearing requirements placed on the side walls and floor are substantially reduced, permitting greater side access to cargo, and minimizing the vertical height of the floor.

SUMMARY OF THE INVENTION

The invention provides improved loading and unloading capability for cargo delivery vehicles. According to one aspect of the invention, there is provided an enclosed transport vehicle having at least an upper and lower tier in vertical alignment for cargo storage. An upper tier cargo platform may be lowered with an elevating means in order to facilitate loading or unloading cargo stored on said platform at a level approximating said lower tier.

According to a second aspect of the invention, there is provided an enclosed transport vehicle having a plurality of independently operable elevating cargo platforms of the type described in which the interior cargo storage area is longitudinally bisected by a center structural wall such that said elevating cargo platforms adjoin other elevating cargo platforms transversely across said center wall and at least one other elevating cargo platform in a longitudinal direction.

According to a third aspect of the invention, there is provided an enclosed transport vehicle having a plurality of adjoining elevating cargo platforms which is structurally capable of accepting cargo loaded through rear access doors while also permitting simultaneous exterior access to cargo unloaded through a plurality of side access doors.

According to a fourth aspect of the invention, there is provided an enclosed transport vehicle having a plurality of adjoining elevating cargo platforms and multiple side access ports which can be entirely and manually unloaded through the sides without requiring unloading personnel to completely enter the vehicle's interior in order to retrieve any portion of the cargo.

According to a fifth aspect of the invention, there is provided an enclosed transport vehicle having a plurality of adjoining elevating cargo platforms in which the load-bearing requirements of the side walls are substantially shifted to a longitudinally bisecting center wall which transfers loads longitudinally to the vehicle's axles.

According to a sixth aspect of the invention, there is provided an enclosed transport vehicle having a plurality of adjoining elevating cargo platforms in which the load-bearing requirements of the floor are substantially shifted to transverse, overhead roof beams which carry outboard loads inward to the center structural wall, which in turn transfers loads longitudinally to the vehicle's axles.

BRIEF DESCRIPTION OF THE DRAWINGS

The invention will be more clearly understood after reference to the following detailed specification read in conjunction with the drawings, wherein:

FIG. 1 is a cut-away perspective view of a multi-tier delivery vehicle generally showing adjoining elevator assemblies arranged in the vehicle's interior.

FIG. 2a shows a multi-tier delivery vehicle backed up to a loading dock ready to receive cargo with elevating platforms positioned down for walk-through loading.

FIG. 2b shows a first set of cargo loaded onto an elevating platform positioned at the lower tier level.

FIG. 2c shows a first set of cargo raised to the upper tier level on an elevating platform.

FIG. 2d shows a second set of cargo loaded onto a lower tier section underneath the raised first set of cargo.

FIG. 2e shows a third set of cargo loaded onto an elevating platform positioned at the lower tier level.

FIG. 2f shows a third set of cargo raised to the upper tier level on an elevating platform.

FIG. 2g shows a fourth set of cargo loaded onto a lower tier section underneath the raised third set of cargo.

FIG. 2h shows the vehicle loaded to capacity, wherein additional cargo sets have been loaded in a front to rear progression.

FIG. 2i shows cargo located on the lower tier accessible for retrieval through a first side of the vehicle.

FIG. 2j shows cargo, previously transported in the upper tier, now positioned at the lower tier level and accessible for retrieval through a first side of the vehicle.

FIG. 2k shows cargo located on the lower tier accessible for retrieval through a second side of the vehicle.

FIG. 2l shows cargo, previously transported in the upper tier, now positioned at the lower tier level and accessible for retrieval through a second side of the vehicle.

DETAILED DESCRIPTION OF THE PREFERRED EMBODIMENT

Figure 2A:
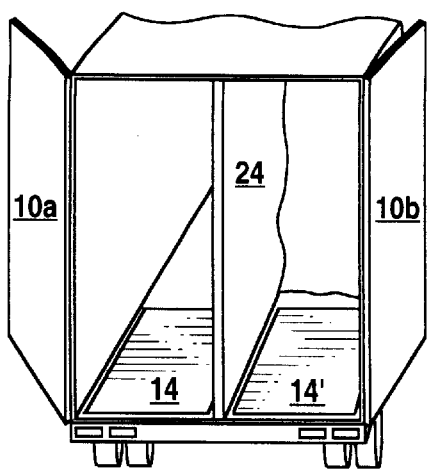
FIGS. 2a–l, when viewed seriatim, show a sequence wherein all tiers of cargo are loaded through rear doors and all tiers of cargo are unloaded through side doors.

In the preferred embodiment, the multi-tier delivery vehicle includes a plurality of independently operable, adjoining elevator assemblies for raising and lowering cargo such as pallets stacked with packages or merchandise. As shown in FIG. 1, delivery vehicle 2 is preferably embodied as a semi-articulated trailer that may be operatively coupled to a motorized tractor means for transport. The delivery vehicle 2 is enclosed by side walls 6 and roof 8 to protect cargo and vehicle mechanisms from the elements, and may preferably be insulated for use in the distribution of temperature sensitive food products. All cargo may be loaded through rear doors 10a and 10b, transported on either an upper or lower tier, and unloaded through multiple side access doors 12. These side access doors 12 are preferably provided in each side wall 6 so as to permit substantially continuous exterior access to all cargo positioned at the lower tier level. The lower tier consists of cargo placed at or on the vehicle floor 4, and every elevating platform 14 (FIG. 2a) may travel between the lower tier and upper tier. Specifically, elevating platform 14a is shown in FIG. 1 positioned at the lower tier for receiving cargo through the rear or delivering cargo through the side. Elevating platform 14c is shown raised to an upper tier position for storage and transportation of cargo, and platform 14b is shown in motion midway between tiers.

It will be readily apparent that the elevator assemblies described can be extended to three, four, or more platforms so as to provide more than two tiers of storage. The two-tiered version herein illustrated world be commonly employed for palletized cargo portions up to four or five feet in height. However, other types of cargo transported in shorter bins may permit the use of several storage tiers, and the elevating platforms herein described may be readily adapted by those skilled in the art to provide for greater numbers of storage tiers.

The loading and unloading sequence can be more readily understood from FIGS. 2a through 2l. In FIG. 2a, delivery vehicle 2 is shown backed up and ready to receive cargo, as from a warehouse loading dock. Elevating platforms 14 and 14' are positioned at the lower tier to permit walk-through loading. Loading personnel may then manually push or otherwise steer cargo portions to convey cargo forward through the interior of the vehicle. Cargo bays on either side of the center structural wall 24 are loaded sequentially in a front to rear progression.

Figure 2B:
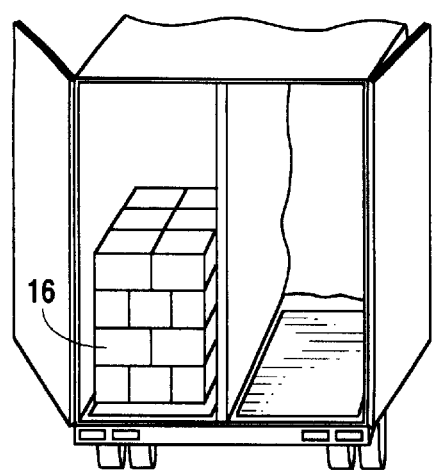
Figure 2C:
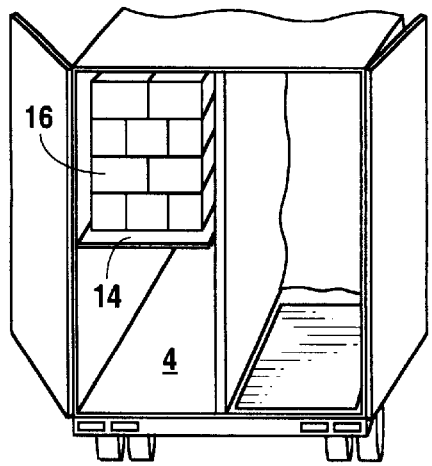
Figure 2D:
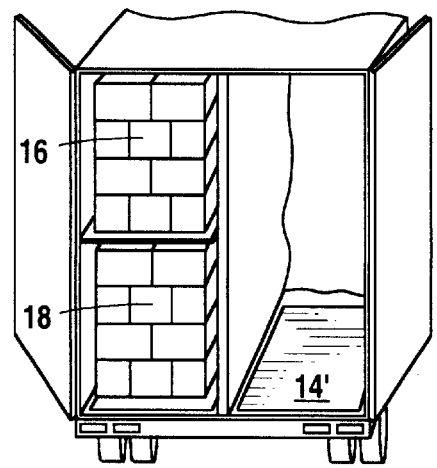
Figure 2E:
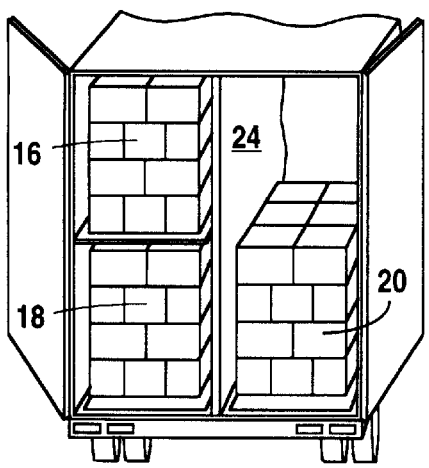
Figure 2F:
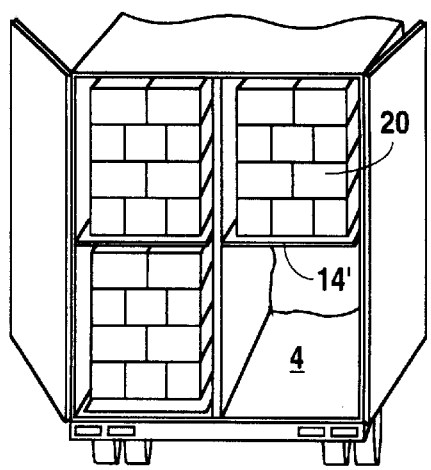
Figure 2G:
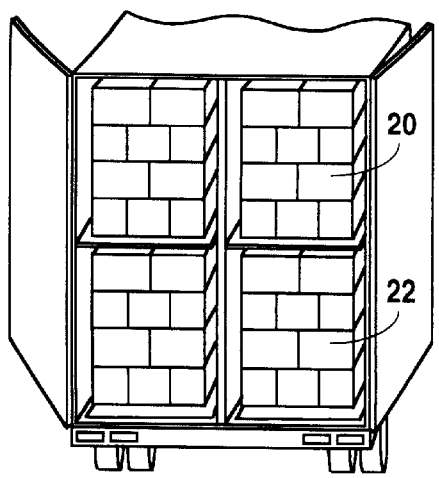

FIG. 2b shows the start of a loading cycle of the rearmost cargo bays, as if all forward bays have been previously loaded in a similar fashion. Onto elevating platform 14 is loaded a first cargo pallet 16. In a manner hereinafter described, elevating platform 14 is raised to an upper tier position as shown in FIG. 2c. Beneath cargo pallet 16 may then be placed a second cargo pallet 18 onto the vehicle's floor 4 as shown in FIG. 2d. In FIG. 2e, a third cargo pallet 20 is loaded onto the elevating platform 14' in the bay transversely opposite the center structural wall 24. FIG. 2f shows third cargo pallet 20 raised on elevating platform 14' with an elevating means, allowing a fourth cargo pallet 22 to occupy the lower tier in FIG. 2g.

Figure 2H:
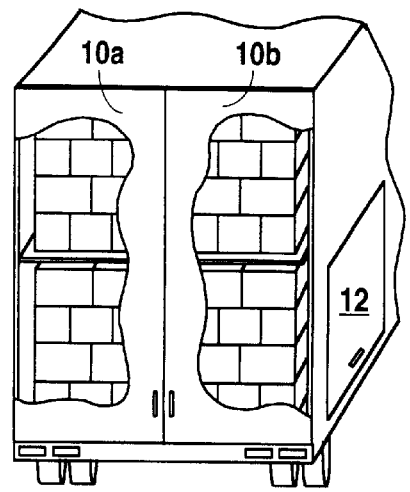
Figure 2I:
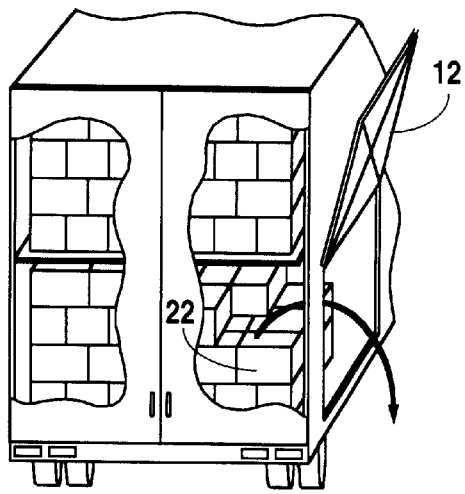
Figure 2J:
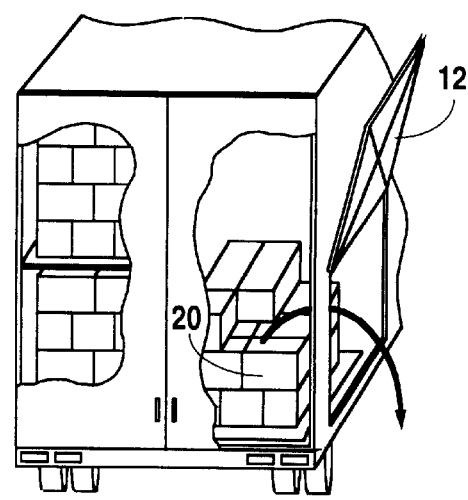
Figure 2K:
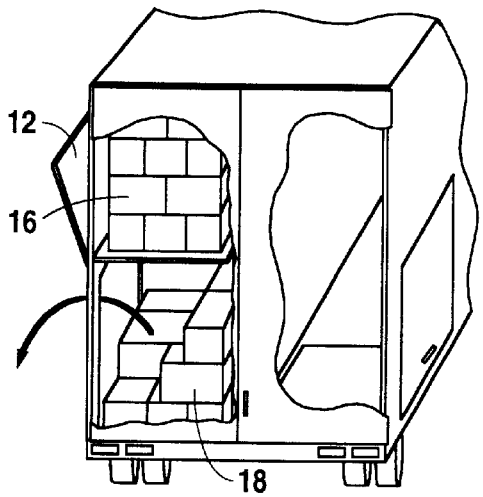
Figure 2L:
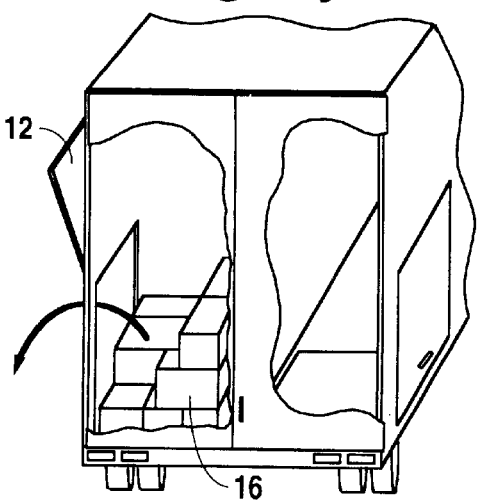

In FIG. 2h, the delivery vehicle is loaded to capacity and ready to distribute cargo at multiple locations. Side access doors 12 provide access to each cargo bay at the lower tier level. FIG. 2l shows fourth cargo pallet 22 being unloaded through side access door 12 at a delivery stop. In FIG. 2j, the lower tier has been fully unloaded and the third cargo pallet 20 has been lowered for unloading. Likewise, on the opposite side of the vehicle, the second cargo pallet 18 may be unloaded through a side access door 12 as in FIG. 2k and then the first cargo pallet 16 descended to occupy the accessible lower tier for further unloading as in FIG. 2l.

It will be readily understood that the foregoing sequence can be reversed so that loading is accomplished through the side doors and unloading is accomplished through the rear doors. Likewise, it will be readily apparent that all loading and unloading may be performed through rear doors only. Also, it can be seen that all loading and unloading may be effected via side doors only. In summary, any combination of rear or side access is permitted for both loading and unloading cargo.

The center structural wall 24 is nominally disposed so as to bisect the transverse dimension of the delivery vehicle, creating two cargo areas of roughly equal size. Because of the permanent longitudinal division created by the center structural wall 24, cargo portions are necessarily limited in transverse width to a dimension somewhat less than half of the legal over-the-road width regulation. Likewise, the use of cargo elevators to mechanically position all tiers of cargo in turn to the elevation of the lowermost tier restricts the vertical unloading height to a dimension somewhat less than half of the legal height limit plus half the height of the tires. Thus, all cargo may be mechanically positioned substantially within the average worker's arm's reach when the worker is standing on the pavement. Additionally, the provision of side access doors at every elevator bay for cargo retrieval permits manual access to the entire payload area without requiring total bodily entry into the vehicle. It is to be understood, however, that less than all of the cargo in the lowermost tier may be accessible through side access doors if it is not desired to furnish the vehicle with side access doors along its entire length.

Figure 3:
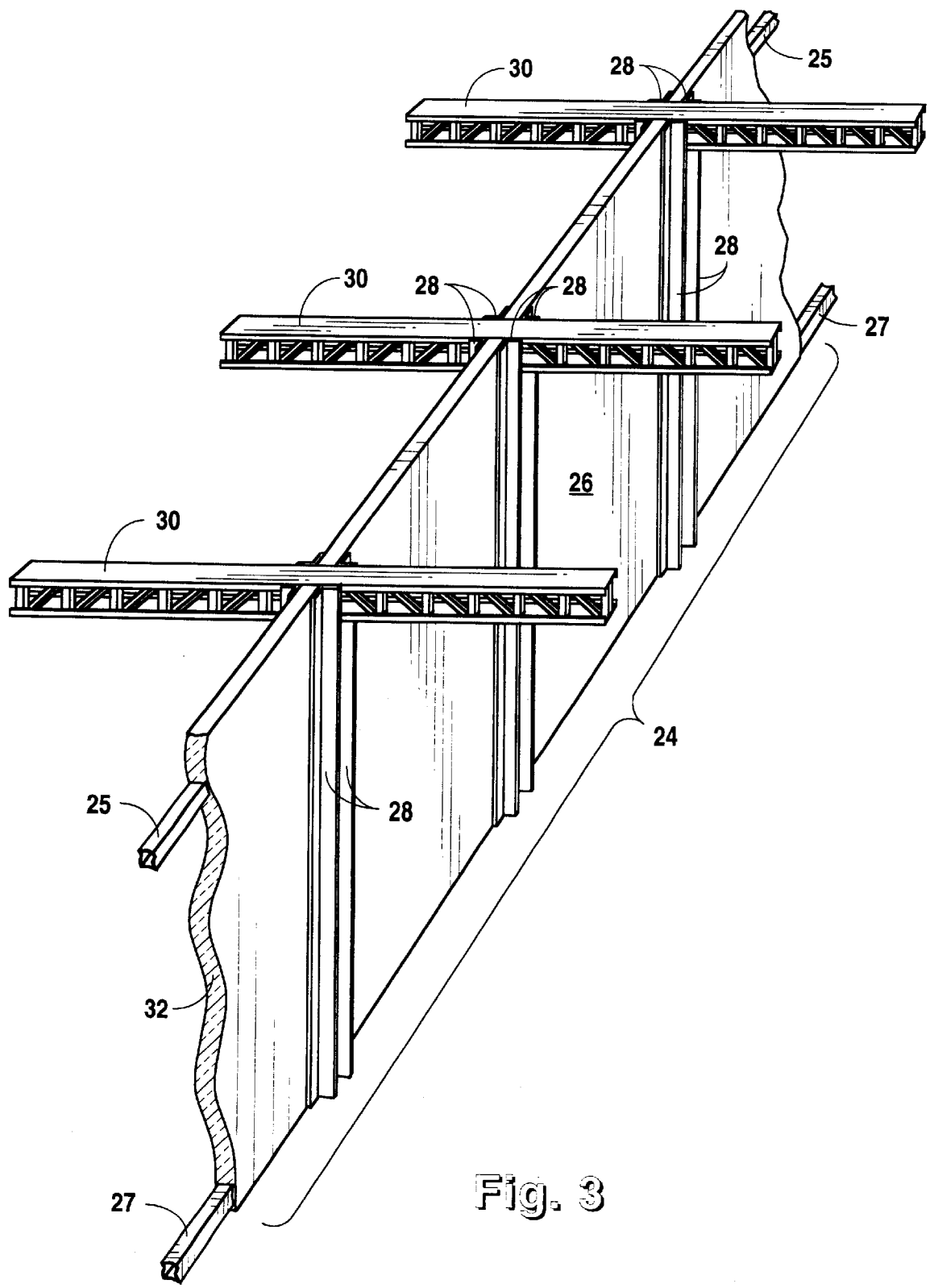
FIG. 3 is a perspective view of a multi-tier delivery vehicle's primary structural framing system.

The preferred embodiment provides a substantially open side wall frame without paying the vertical height or gross vehicle weight penalty of a thick, load-bearing floor. Referring now to FIG. 3, a center structural wall 24 is provided which serves as the primary load-path carrying cargo and vehicle weight fore and aft longitudinally to the vehicle's axles. In this embodiment, the center wall 24 is constructed with clusters of vertical compression members, which also incidentally serve as platform guide rails 28. Running longitudinally between and permanently affixed to these platform guide rails are two sheet metal stressed skins 26. These skins are spaced apart transversely to allow a polyurethane foam core 32 to be added to provide greater rigidity and an insulated thermal bulkhead for accommodating multi-temperature cargo portions. Top chord 25 and bottom chord 27 connect the upper and lower ends of platform guide rails 28, and the stressed skins 26 provide a diagonal tension load-path. Thus, the center structural wall 24 is able to beam loads as would a very deep, weight-efficient truss. The clusters of four platform guide rails 28 acting together as a column at the intersection of four elevator bays provide a lightweight yet durable structural configuration with lateral stability for supporting loads on transverse roof trusses 30.

Transverse roof trusses 30 placed directly over top chord 25 provide an overhead means for outboard loads to get inward to the center structural wall 24 and then fore or aft to get down to the tires. Elevating platforms 14 are suspended from these transverse roof trusses 30 as well as all outboard platform guide rails 28. The benefit of such an arrangement is that even the weight of cargo placed directly on the vehicle floor 4 may find a load path to one of the transverse roof trusses 30 via the platform guide rails 28, resulting in a capacity to minimize the vertical height of the vehicle floor 4, and thus the total unloading height. Open web roof trusses are preferred to solid roof beams from the standpoint of weight-savings and for their capability to provide for an air circulation plenum in temperature-controlled delivery applications.

Figure 4:
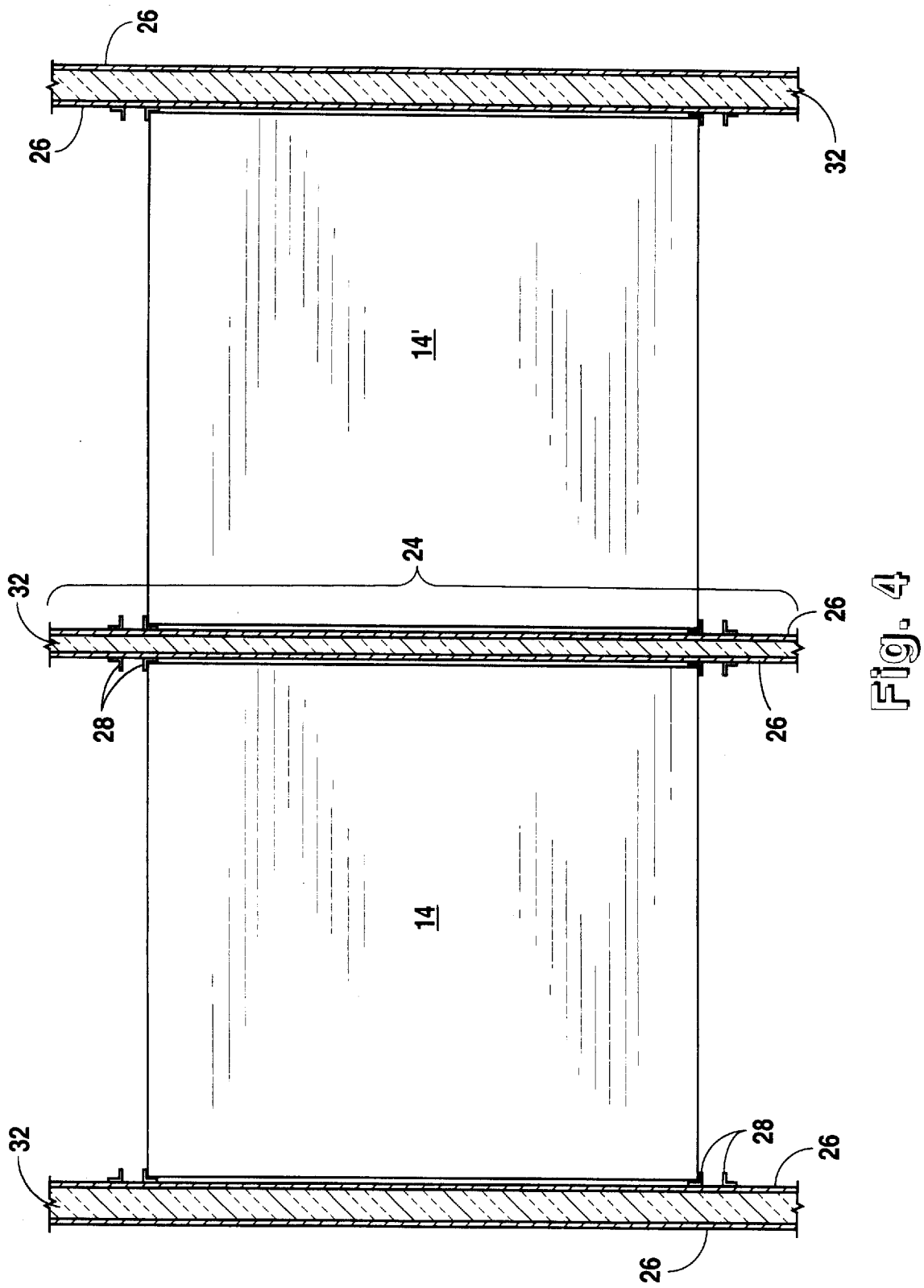
FIG. 4 is an overhead plan view of a cross-section of the vehicle showing two transversely adjoining elevating platforms confined within vertical guide rails.

An overhead plan view of the elevating platforms 14 and 14' is shown by FIG. 4 as they are constrained at the corners from side-to-side and front-to-back movement by the platform guide rails 28. The framing configuration reduces structural demands on the sidewalls, which translates to a substantially reduced requirement for steel or aluminum members inside the exterior walls. The platform guide rails 28 provide structural rigidity to the exterior walls while remaining inside the insulated enveloped defined by polyurethane foam cores 32. The result of such a construction is superior thermal integrity.

Figure 5:
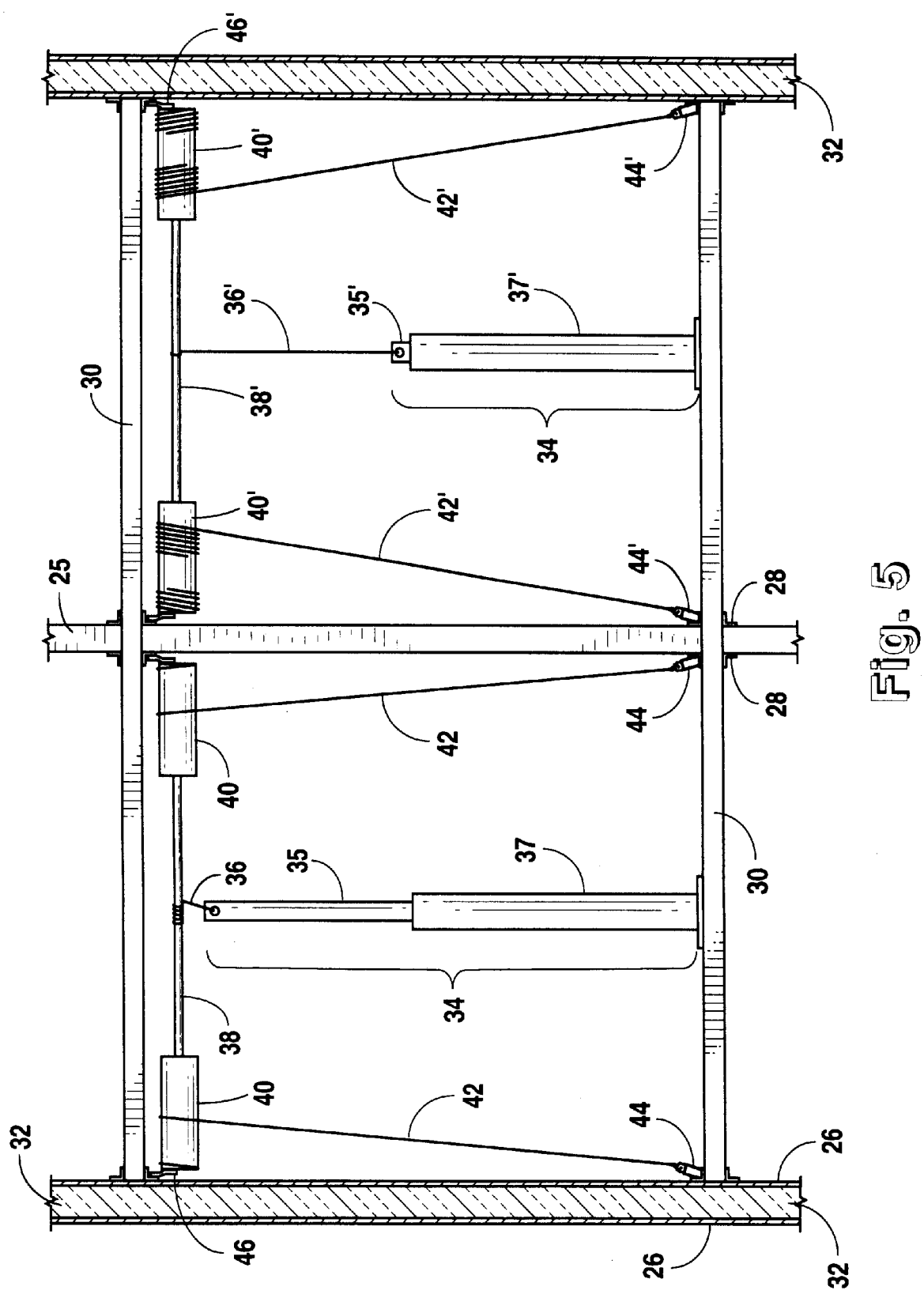
FIG. 5 is an overhead plan view of a cross-section of the vehicle showing two independently operable elevator mechanisms for raising and lowering elevating platforms.

Within the plane defined by the transverse roof trusses 30 may be placed the means for mechanically elevating the elevating platforms 14. FIG. 5 shows an apparatus preferred for its reliability and simplicity. A remotely located hydraulic pump and reservoir provide fluid power on demand to actuate a hydraulic ram 34 (34' in the adjacent bay). As piston 35 is retracted into cylinder body 37, drive cable 36 unwinds, thereby rotating windlass shaft 38 and causing slave cables 42 to coil around windlass drums 40 and take up an elevating platform 14. Four slave cables 42 are attached to the four corners of each elevating platform 14. Corresponding components in the adjacent bay are represented by hydraulic ram 34', piston 35', cylinder body 37', drive cable 36', windlass shaft 38', slave cables 42', and windlass drums 40'.

Each slave cable 42 assists in bearing the weight of the upper tier cargo and transferring their gravity loads to transverse roof trusses 30 via pulleys 44 and windlass bearings 46. The hydraulic ram 34 is sufficiently powerful to overcome the mechanical disadvantage created by the drive cable 36 turning windlass shaft 38 of shorter radius than windlass drum 40. The benefit of said mechanical disadvantage is that a short stroking piston 35 may multiply the distance that the slave cables 42 travel. Those skilled in the art will recognize that other lifts, such as electric winches, fluid-powered rotary actuators, or ball screw linear actuators, could also be used.

While a particular embodiment of the invention has been illustrated and described, it will be obvious to those skilled in the art that various changes and modifications may be made without sacrificing the advantages provided by the principles of construction or methods disclosed herein.

Having described our invention, we claim:

1. A method of loading and delivering cargo in a multi-tier storage delivery vehicle, comprising the steps of:
   loading a plurality of first cargo portions through a rear door of said vehicle and onto a plurality of corresponding elevating platforms disposed within said vehicle;
   raising said elevating platforms with a plurality of corresponding lift means;
   loading a plurality of second cargo portions through a rear door of said vehicle so that said second cargo portions are disposed beneath said first cargo portions;
   unloading said second cargo portions through at least one side access door of the vehicle;
   lowering said elevating platforms with the corresponding lift means; and
   unloading said first cargo portions through said at least one side access door of the vehicle.

2. The method of claim 1, further comprising the step of separating said first and second cargo portions into two groups of tiered cargo with a structural support means vertically disposed in said vehicle, each of said groups including cargo from said first and second cargo portions.

3. The method of claim 2, wherein said structural support means is disposed longitudinally in the vehicle and bisects the vehicle's transverse dimension.

4. The method of claim 3, further comprising the step of suspending said elevating platforms from transverse roof support means coupled to structural support means.

5. A method of loading and delivering cargo in a multi-tier storage delivery vehicle, comprising the steps of:
   loading a plurality of first cargo portions through at least one side access door of said vehicle and onto a plurality of corresponding elevating platforms disposed within said vehicle;
   raising said elevating platforms with a plurality of corresponding lift means;
   loading a plurality of second cargo portions through at least one side access door of said vehicle so that said second cargo portions are disposed beneath said first cargo portions;
   unloading said second cargo portions through a rear door of the vehicle;
   lowering said elevating platforms with the corresponding lift means; and
   unloading said first cargo portions through said rear door of the vehicle.

6. The method of claim 5, further comprising the step of separating said first and second cargo portions into two groups of tiered cargo with a structural support means vertically disposed in said vehicle, each of said groups including cargo from said first and second cargo portions.

7. The method of claim 6, wherein said structural support means is disposed longitudinally in the vehicle and bisects the vehicle's transverse dimension.

8. The method of claim 7, further comprising the step of suspending said elevating platforms from transverse roof support means coupled to structural support means.

9. A method of loading and delivering cargo in a multi-tier storage delivery vehicle, comprising the steps of:
   loading a plurality of first cargo portions through a rear door of said vehicle and onto a plurality of corresponding elevating platforms disposed within said vehicle;
   raising said elevating platforms with a plurality of corresponding lift means;
   loading a plurality of second cargo portions through a rear door of said vehicle so that said second cargo portions are disposed beneath said first cargo portions, said first and second cargo portions being separated into two groups of tiered cargo by a structural support means vertically disposed in said vehicle, each of said groups including cargo from said first and second cargo portions;
   unloading said second cargo portions through a rear door of the vehicle;
   lowering said elevating platforms with the corresponding lift means; and
   unloading said first cargo portions through said rear door of the vehicle.

10. The method of claim 9, wherein said structural support means is disposed longitudinally in the vehicle and bisects the vehicle's transverse dimension.

11. The method of claim 10, further comprising the step of suspending said elevating platforms from transverse roof support means coupled to structural support means.

* * * * *